Mar. 3, 1925. 1,528,179
H. L. BALDRIDGE
FISH HATCHERY POND
Filed Aug. 13, 1923  2 Sheets-Sheet 1

Inventor
Henry L. Baldridge
By
Attorney

Mar. 3, 1925.

H. L. BALDRIDGE

FISH HATCHERY POND

Filed Aug. 13, 1923

1,528,179

2 Sheets-Sheet 2

Inventor
Henry L. Baldridge
By P. J. Elliott
Attorney

Patented Mar. 3, 1925.

1,528,179

UNITED STATES PATENT OFFICE.

HENRY L. BALDRIDGE, OF STEILACOOM LAKE, NEAR TACOMA, WASHINGTON.

FISH-HATCHERY POND.

Application filed August 13, 1923. Serial No. 657,193.

*To all whom it may concern:*

Be it known that I, HENRY L. BALDRIDGE, a citizen of the United States, residing at Steilacoom Lake, near Tacoma, in the county of Pierce, State of Washington, have invented certain new and useful Improvements in Fish-Hatchery Ponds, of which the following is a specification.

This invention relates to ponds in fish hatcheries and especially to the ponds in which the fish are reared. The objects of the invention are to provide a pond in which all refuse will be quickly eliminated from the section in which the fish naturally swim; to provide a definite area in which such refuse will collect; to provide means whereby the refuse may be quickly cleaned away without disturbing the fish; and thus to provide an efficient rearing pond which is easily operated and cared for, which is cheap to construct and permanent in character.

Figure 1:
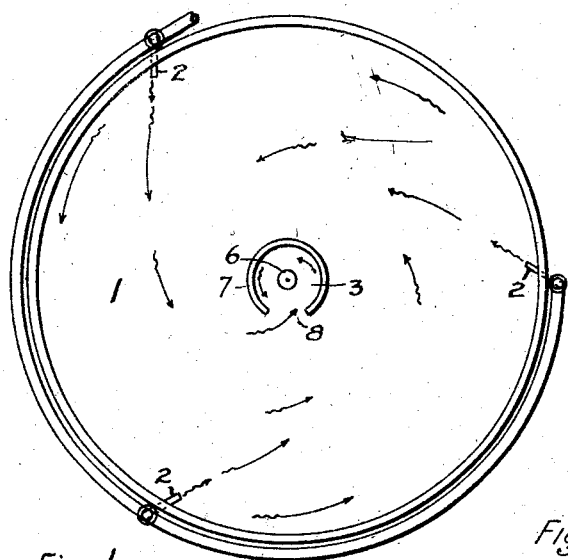
Figure 2:
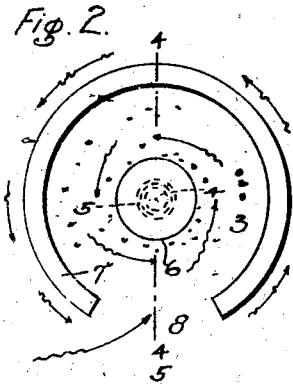
Figure 3:
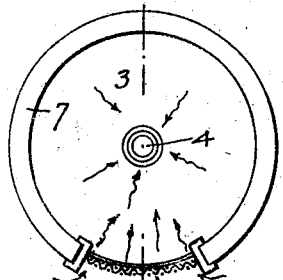
Figures 4, 5:
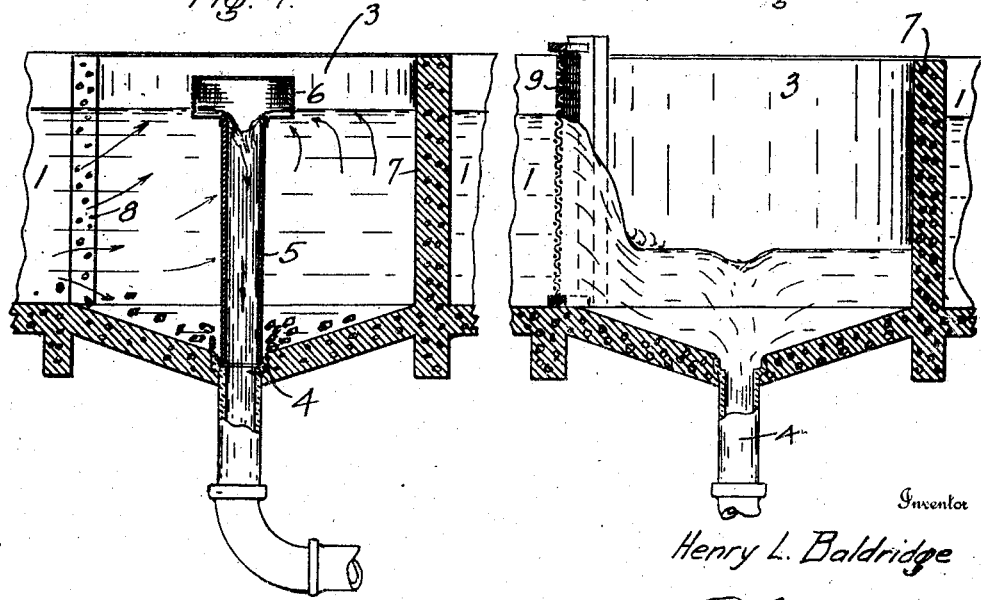
Figure 6:
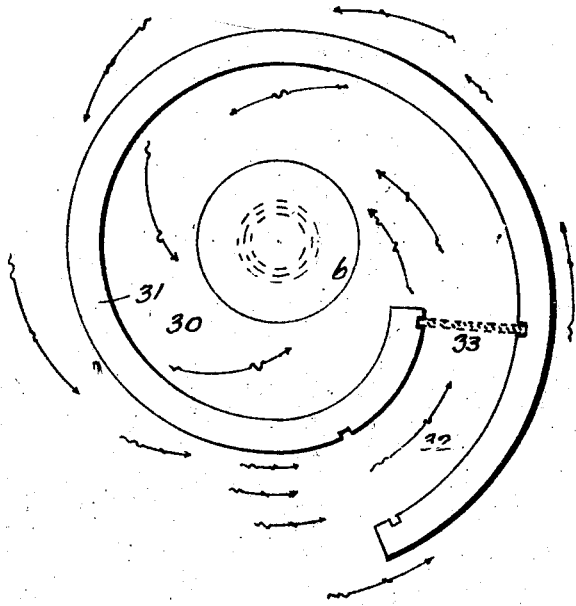
Figure 7:
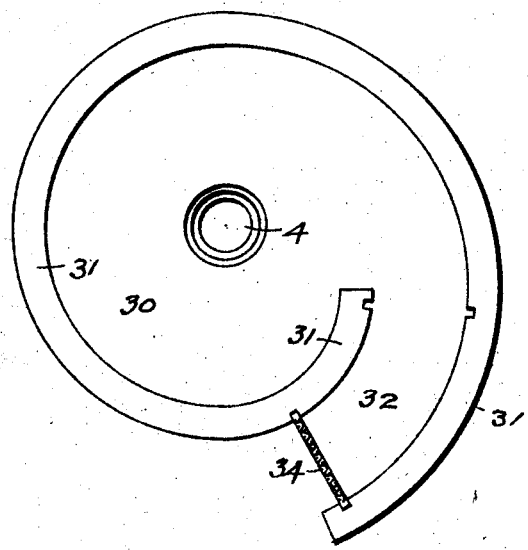

I attain these and other objects by the devices and arrangements illustrated in the accompanying drawings, in which: Fig. 1 is a plan of the complete pond; Fig. 2 is a plan of the overflow drain and refuse collecting chamber in normal use; Fig. 3 is a similar view showing the overflow drain removed and the refuse being carried away by the flow of water; Fig. 4 is a vertical section on the line 4—4 in Fig. 2 and Fig. 5 is a vertical section on the line 5—5 in Fig. 3; Fig. 6 is a plan of another form of refuse collecting chamber in normal use; and Fig. 7 is a similar view showing it being cleared out.

Similar numerals of reference refer to similar parts throughout the several views.

The usual method of cleaning out a fish rearing pond takes a considerable length of time and much labor and is the occasion of much disturbance to the fish. In my invention I have overcome all these difficulties by causing all the refuse to be carried by the circulating water to a central chamber having an area of substantially quiet water in which such matter collects, thus keeping the major portion of the pond constantly free of contamination; then I close off this chamber from the pond and remove the overflow pipe thus emptying the chamber and clearing out the said collected refuse, and at the same time I permit a flow from the main pond to wash out the said chamber; and this effect is reached in a very few minutes' time with substantially no labor and practically without disturbing the fish.

Referring to the drawings:—The main pond 1 is of circular form and has a plurality of water inlet pipes 2, each projecting a stream of water at an angle both to the radius and the tangent of the pond at that point and all said streams being at similar angles. The excess water leaves the pond at the center and thus these streams cause a spiral motion to the current in the pond.

At the center of the pond I form a refuse chamber 3 and the drain outlet pipe 4 is located at the center of this chamber. The overflow pipe 5, preferably made of a length of wooden pipe, fits loosely in and closes the direct entrance to the drain 4 and extends upward therefrom and is of such height as may be desired for the depth of the water in the pond 1 and chamber 3. A suitable screen 6 is mounted on the otherwise open end of the overflow pipe 5. The wall 7 of the chamber 3 does not completely close said chamber but leaves an opening 8 which normally gives free access of the water, the fish, and the refuse into the chamber 3. Now the spiral current of the water carries all refuse with it towards the center and thus through the opening 8 into the circular chamber 3, but the said current passes upward in the chamber to flow out over the top of the overflow pipe 5 thus leaving an area of dead water at the base of the said pipe 5. The floor of the pond 1 is substantially level but the floor of the chamber 3 is graded down so that the drain entrance is lower than the floor of the pond 1. All the refuse which is thus carried by the stream is deposited in this area of dead water near the base of the overflow pipe 5 and therefore near the mouth of the drain 4. When it is desired to clean out this refuse, a screen 9 is placed in the opening 8 in the wall 7, of such a fine mesh as may prevent the passage therethrough of the fish in the pond 1; then the overflow pipe 5 is lifted out of the end of the drain pipe 4 and the water in the chamber 3 immediately flows violently out through said drain and carries all the collected refuse with it. As the level of the water in the chamber 3 is lowered the water in the pond 1 passes through the screen 9 and further washes out the bottom of the chamber. Then the pipe 5 is replaced and the water again rises in the pond and the chamber until it reaches the normal level at the height of the overflow pipe 5. All this has taken a very few minutes and since the volume of the chamber 3 is very small as compared to that of the pond 1, it is evident that the level of the water in the pond is scarcely lowered at all and the fish therein have not been disturbed except in the small area immediately adjacent to the opening 8 and, even there, the current created by the fall into the chamber 3 is of gradually increasing strength but is not greater than would be met in many places in a natural stream. In the normal operation of the pond, when the screen 9 is removed from the opening 8, the fish do not readily enter the chamber 3 but remain in the main pond 1 but, in case any should be in the chamber when it is desired to clean it out, they are easily driven out through the opening 8 before the screen 9 is placed therein, because they naturally swim against the current and would therefore pass out of said opening.

In Figs. 6 and 7 I have shown another form of the collecting chamber and this form is perhaps better adapted for use when the fish are very small. In this case the central chamber 30 is not completely circular in plan but the walls 31 thereof may be spiral, or of some similar shape, in plan as shown, so as to provide an enclosed chamber 30 with a spiral entrance 32 between substantially parallel sections of the said wall 31. This entrance passage has two points therein in which screens may be placed if desired. When very small fish are in the pond the inner screen may be placed at 33 (shown dotted in Fig. 6) and, in that case, the refuse will collect in the passage 32 and the fish will not enter the chamber proper. Then the outer screen 34 (Fig. 7) is placed in position and the inner screen 33 is removed thus causing the rush of water, when the overflow pipe 5 is removed, as above, to sweep all the refuse collected therein into the chamber 30 and out through the drain 4. In this case the opening of the passage 32 is directly in the line of the revolving or spiral current in the pond and the screens 33 and 34 are at right angles to the stream. Fish will not naturally enter this passage 32 because they would have to go in with the current in order to do so.

It is, of course, understood that the pond may be constructed of any size and material convenient but I prefer to use concrete walls and floor for all parts. I prefer to make the diameter of the main pond about thirty-five feet and that of the chamber 3 about five feet six inches, and the depth of water in the main pond about three feet. The overflow pipe 5 may be conveniently made of wood, as stated, but in any case it should be of light material so as to permit of easy handling. The floor of the main pond is usually not made with concrete but is covered with a thickness of gravel. The fish screens 9 and 34 should be strong enough to withstand the pressure of the water thereon when the chamber 3 or the passage 32 are being drained, and they may be made either with the screen part covering the entire surface or a part may be solid material and the rest of screening. The mesh, however, must be such as to prevent the passage of fish therethrough. In practice I prefer to locate the inlet pipes 2 near the floor of the pond as, in this way, the refuse is more thoroughly evacuated than if the stream is stronger at the top, and it is understood that each such inlet pipe 2 is controlled by a suitable valve as shown.

Having described my invention, what I claim is:—

1. A fish rearing pond comprising a circular main pond; water supply pipes entering said pond at an angle; a refuse chamber in open communication with said main pond and positioned at the center thereof; a drain at the center of the refuse chamber; and an overflow pipe closing the direct entrance into the drain pipe whereby the water in the pond is given a spiral motion towards the center and an upward motion in the central chamber and whereby the refuse from the main pond is collected on the floor of the refuse chamber.

2. A fish rearing pond as set forth in claim 1, together with a removable closure in the entrance to the refuse chamber, and wherein the overflow pipe is removable whereby, when the pipe is removed, the water and refuse in the chamber are drained out.

3. A fish rearing pond as set forth in claim 1, wherein the wall of said central chamber is continuously curved and the opening into the chamber is between its ends.

HENRY L. BALDRIDGE.